(12) United States Patent
Saxena et al.

(10) Patent No.: US 6,214,084 B1
(45) Date of Patent: Apr. 10, 2001

(54) IRON MANUFACTURING PROCESS

(75) Inventors: Neeraj Saxena, Murray Hill; Paul Alfred Sweeney, Basking Ridge; Akhilesh Kapoor, New Providence, all of NJ (US)

(73) Assignee: The BOC Group, Inc., Murray Hill, NJ (US)

(*) Notice: Subject to any disclaimer, the term of this patent is extended or adjusted under 35 U.S.C. 154(b) by 0 days.

(21) Appl. No.: 09/072,279

(22) Filed: May 4, 1998

Related U.S. Application Data

(60) Provisional application No. 60/057,446, filed on Sep. 3, 1997.

(51) Int. Cl.[7] .............................. C21B 3/02; C21B 11/00
(52) U.S. Cl. .............................. 75/453; 75/468; 75/489; 75/501; 75/502; 75/529; 95/139; 95/140
(58) Field of Search .............................. 75/453, 500, 501, 75/502, 444, 529, 489, 464, 468, 10.38; 266/156; 95/140, 139

(56) References Cited

U.S. PATENT DOCUMENTS

| | | | |
|---|---|---|---|
| 2,745,733 | * | 5/1956 | Oster .............................. 75/453 |
| 3,884,677 | * | 5/1975 | Wenzel et al. .............................. 75/464 |
| 4,260,412 | | 4/1981 | Summers et al. . |
| 4,668,255 | * | 5/1987 | Govind .............................. 95/140 |
| 4,892,565 | * | 1/1990 | Schmidt et al. .............................. 95/140 |
| 4,913,733 | | 4/1990 | Hauk . |
| 4,976,776 | * | 12/1990 | Elvander et al. .............................. 75/483 |
| 5,043,011 | | 8/1991 | Hauk . |
| 5,065,985 | * | 11/1991 | Takahashi et al. .............................. 266/156 |
| 5,647,888 | * | 7/1997 | Keogh et al. .............................. 75/453 |
| 5,662,860 | * | 9/1997 | Klaasen et al. .............................. 75/453 |
| 5,676,732 | * | 10/1997 | Viramontes-Brown et al. ...... 75/492 |
| 5,800,592 | * | 9/1998 | den Hartog et al. .............................. 75/453 |

FOREIGN PATENT DOCUMENTS

| | | |
|---|---|---|
| 15 08 072 | 2/1969 | (DE) . |
| 0 179 014 | 4/1986 | (EP) . |
| 0 318 896 | 6/1989 | (EP) . |
| 0 690 136 | 1/1996 | (EP) . |
| 59107009 * | 6/1984 | (JP) .............................. 75/464 |

\* cited by examiner

*Primary Examiner*—Roy King
*Assistant Examiner*—Tima McGuthry-Banks
(74) *Attorney, Agent, or Firm*—Philip H. Von Neida; Salvator P. Pace

(57) ABSTRACT

Iron ore is reduced to molten iron by introducing the ore into a reactor while combusting coal with pure oxygen in the reactor. The molten iron phase, which forms at the bottom of the reactor, is stirred by injecting carbon monoxide into the molten iron. In a preferred embodiment, finely pulverized iron ore is injected with pure oxygen tangentially into a cyclone section of the furnace situated on top of a converter section, thereby causing melting and preliminary reduction of the ore to take place in the cyclone section. Primary reduction of the iron oxide occurs in the converter section of the furnace.

1 Claim, 1 Drawing Sheet

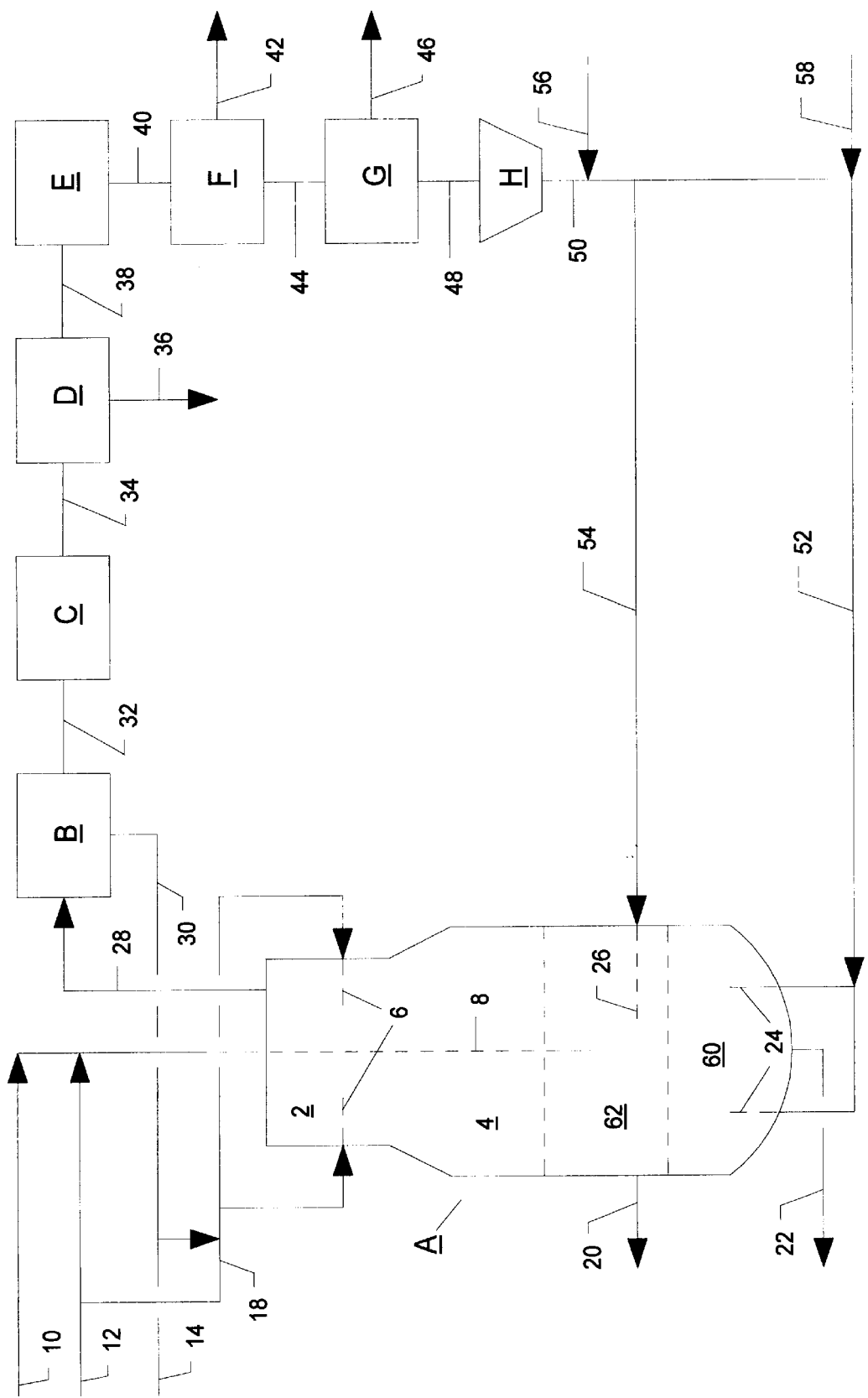

IRON MANUFACTURING PROCESS

This application claims priority from Provisional Patent Application No. 60/057,446 filed Sep. 30, 1997.

FIELD OF THE INVENTION

This invention relates to the manufacture of iron and more particularly to the production of iron by smelting processes. Specifically, the invention relates to the introduction of carbon monoxide to the smelting furnace of an ironmaking plant.

BACKGROUND OF THE INVENTION

Iron is produced in furnaces into which iron ore, a fuel, usually coal or coal char, and oxygen are introduced. The ore, primarily $Fe_2O_3$, undergoes a preliminary reduction to FeO by contact with carbon monoxide and carbon in the top part of the furnace or in a chamber above the furnace, and the FeO is further reduced to metallic iron by contact with carbon monoxide and other reducing gases in the lower part of the furnace. The carbon monoxide is produced by partial combustion of the fuel, which is introduced into the lower part of the furnace together with oxygen. During the course of the process, a layer of molten iron forms at the bottom of the furnace and a layer of slag, produced from slagging agents introduced into the furnace with the fuel and from impurities contained in the ore, forms on top of the molten iron.

The hot waste gas exiting the furnace generally contains, by volume, about 10 to 35% carbon monoxide, about 2 to 15% hydrogen, about 40 to 55% carbon dioxide and the balance mostly nitrogen, water vapor, sulfur compounds ($SO_x$, $H_2S$, etc.) and nitrogen oxides $NO_x$). Ore and ash solids are also entrained in the waste gas. The waste gas is generally passed through particle separator to remove the solids, then passed through a waste gas boiler to recover heat energy, then treated to remove sulfur and nitrogen oxides, then combusted to recover the fuel value of the carbon monoxide contained in the gas, and finally discharged into the atmosphere.

In order to improve the efficiency of the ironmaking process, a stream of inert gas, such as nitrogen, can be bubbled through the molten iron to agitate the melt and thereby improve contact between any unconverted FeO in the melt and the carbon monoxide and carbon. Introduction of nitrogen into the furnace has certain disadvantages. Since nitrogen is inert and has no fuel value; additional fuel must be introduced into the furnace to provide the energy necessary to heat the nitrogen to the desired operating temperature. Additionally, the nitrogen increases the volume of waste gas issuing from the top of the furnace, thus increasing the size requirements of the waste gas treating equipment used with the furnace. Furthermore, the high temperature inside the furnace causes some of the nitrogen to be converted to nitrogen oxides, thereby increasing the concentration of pollutants in the waste gas, and the presence of nitrogen in the waste gas lowers the combustible value of the gas.

Methods of improving the operating efficiency of ironmaking processes are continuously sought. The present invention provides a significant improvement in the operating efficiency of these processes by significantly reducing, or entirely eliminating, intentional introduction of nitrogen into the furnace, by enhancing the efficiency of fuel conversion in the furnace efficiency, and by reducing the amount of sulfur in the molten iron by reducing fuel consumption.

SUMMARY OF THE INVENTION

The invention comprises replacing part or all of the nitrogen stirring gas introduced into the molten iron phase and/or the slag phase formed in an ironmaking reactor with reducing gas.

In a broad embodiment, the invention comprises a process for producing iron from iron ore comprising the steps:
  (a) combusting a carbonaceous fuel with oxygen in a reactor having a reservoir, thereby producing heat and carbon monoxide;
  (b) contacting iron ore and slagging agent with the carbon monoxide in the reactor in the presence of heat, thereby converting iron oxides in the ore to molten iron and forming in the reservoir a molten iron phase and a slag phase; and
  (c) periodically removing molten iron and slag from the reactor;
the improvement comprising introducing reducing gas into the molten iron phase, into the slag phase or into both the molten iron phase and the slag phase.

The invention is particularly applicable when used in a plant in which carbon monoxide-containing off gas is discharged from the reactor.

In a preferred embodiment of the invention, the reactor comprises an upper cyclone section and a lower converter section. In this preferred embodiment, high purity oxygen and the iron ore are injected tangentially into the cyclone section of the reactor. Additionally, the carbonaceous fuel and high purity oxygen are introduced into the converter section of the reactor.

In another preferred embodiment, at least part of the reducing gas is carbon monoxide-rich gas. The carbon monoxide-rich gas can be produced from the carbon monoxide-containing off gas. In this embodiment, this carbon monoxide-rich gas can be obtained by passing the carbon monoxide-containing off gas through a carbon dioxide-removal system. The carbon dioxide-removal system is preferably an adsorption system containing a carbon dioxide-selective adsorbent.

In another preferred aspect, water vapor, one or more nitrogen oxides, one or more sulfur oxides or combinations of any of these are removed from the carbon monoxide-containing off gas.

In another preferred embodiment of the invention, at least part of the reducing gas is obtained by passing the carbon monoxide-containing off gas through a gas separation system comprising means for separating nitrogen, argon or mixtures thereof from the carbon monoxide-containing off gas. In a more preferred embodiment, this gas separation system comprises one or more adsorbents. In another preferred embodiment, at least part of the reducing gas is obtained by passing the carbon monoxide-containing off gas through both a carbon dioxide-removal system and the above-mentioned gas separation system. In a preferred aspect of this preferred embodiment, the carbon monoxide-containing off gas is first passed through a carbon dioxide-removal system and then passed through the gas separation system.

In another preferred embodiment of the invention, at least part of the reducing gas is obtained by passing the carbon monoxide-containing off gas through a carbon monoxide removal system, which, in a more preferred embodiment, comprises a carbon monoxide-selective adsorbent. In another preferred embodiment, at least part of the reducing gas is obtained by passing the carbon monoxide-containing off gas through both a carbon dioxide-removal system and a carbon monoxide removal system. In a more preferred embodiment, the carbon monoxide-containing off gas is passed through a carbon dioxide-removal system and then passed through a carbon monoxide removal system.

In another preferred embodiment, a diluent gas selected from nitrogen, argon, carbon dioxide or mixtures of two or all of these is introduced into the molten iron phase, introduced into the slag phase or introduced into both the molten iron phase and the slag phase with or in addition to the reducing gas. In this preferred embodiment, the diluent gas can be obtained from the carbon monoxide-containing off gas. The reducing gas and the diluent gas can be introduced together or introduced separately into the molten iron phase, into the slag phase or into both the molten iron phase and said slag phase. The reducing gas and the diluent gas can be introduced into the molten iron phase, into the slag phase or into both the molten iron phase and the slag phase through one or more concentric conduits, with the reducing gas being introduced through the center conduit and the diluent gas being introduced through an outer concentric conduit.

In another preferred embodiment of the invention, hydrocarbon fuel is introduced into the molten iron phase, into the slag phase or into both the molten iron phase and the slag phase. The reducing gas and hydrocarbon fuel can be introduced as a mixture or they can be separately introduced into these phases. In a more preferred aspect of this preferred embodiment, the fuel is methane.

In another preferred embodiment of the invention, reducing gas and/or hydrocarbon fuel are introduced together or separately into the gas phase above the slag phase in the reactor. In a more preferred embodiment, the fuel is methane.

BRIEF DESCRIPTION OF THE DRAWINGS

The drawing FIGURE illustrates a preferred embodiment of the invention, practiced in a cyclone converter furnace system.

DETAILED DESCRIPTION OF THE INVENTION

The invention provides the improvement of introducing reducing gas into the lower part of an ironmaking furnace. As used in this description the expression "reducing gas" means a carbon monoxide- and/or hydrogen-containing gas in which the ratio of total moles of carbon monoxide and hydrogen to the total moles of carbon dioxide and water vapor in the gas is at least 5. The reducing gas may be comprised of substantially pure carbon monoxide, substantially pure hydrogen, or mixtures of one or both of these with hydrocarbons, particularly methane. The preferred reducing gas is carbon monoxide-rich gas, i. e., gas that contains at least 60 volume percent carbon monoxide.

The reducing gas serves several purposes. Part of it provides additional reducing action at a point in the furnace where it is necessary to ensure that the last remnants of iron oxide are reduced to metallic iron. The rest of it functions as fuel to help heat the lower part of the furnace. Replacing the nitrogen conventionally used to provide agitation of the layers of molten iron and slag with reducing gas additionally imparts the advantages of providing better contact between the iron oxide in the melt and slag with reducing gas by introducing the reducing gas directly into the melt and/or slag, and reducing the overall amount of inert gas that must be heated in the furnace and separated from the waste gas, if it is desired to recover byproduct carbon dioxide from the waste gas. Using recycled carbon monoxide-rich gas as the reducing gas provides the additional advantage of reducing the net carbon monoxide that is discharged from the furnace system, thus reducing the total fuel consumption and reducing or eliminating the use of carbon monoxide as waste fuel gas.

The invention can be used with any ironmaking process in which iron ore is reduced in a furnace and molten iron is collected at the bottom of the furnace, including blast furnaces and electric arc furnaces, however, for ease of description it will be described as it applies to the production of iron by the cyclone converter furnace method, which is the preferred embodiment of the invention.

The CCF ironmaking reactor is a two-zone furnace consisting of a cyclone section mounted on top of a conventional smelter/converter. A mixture of finely ground iron ore and slagging agent is pneumatically tangentially injected into the cyclone section with high purity oxygen. As used in the description of this invention, the term "slagging agent" is a substance which aids in the formation of slag in the ironmaking reactor. Slagging agents include alkaline substances, such as lime, limestone, magnesium oxide, etc., and acidic oxides, such as alumina, silica, etc. The term "high purity oxygen" means a gas which contains at least 90 volume percent oxygen. Preferably the high purity oxygen used in the process of the invention is oxygen-enriched air, an oxygen-argon gas mixture or substantially pure oxygen. In the cyclone section the swirling ore is intensively mixed with hot reducing gases rising from the converter section of the furnace. This causes the ore to melt and undergo partial reduction, and the molten, partially reduced ore collects on the water-cooled sidewall of the cyclone section and runs down the wall and into the liquid bath. The hot rising gases are produced by combustion of a fuel, such as coal, with pure oxygen, in and above the liquid melt. The coal and oxygen are introduced into the converter section of the reactor, generally by pneumatics or gravity flow through a conduit which extends down onto the converter section from the top of the reactor. The coal is combusted to carbon monoxide and carbon dioxide, thus producing heat. The carbon monoxide generated in the converter section of the reactor completes the reduction of the iron oxide to molten iron.

The invention can be more thoroughly understood from the following description, considered with the appending drawing. Turning now to the drawing, illustrated therein is a cyclone converter furnace (CCF) ironmaking plant comprising, as units, a CCF reactor, A, a particle separator, B, a waste heat recovery unit, C, a waste gas prepurifier, D, a carbon dioxide removal unit, E, a gas drying unit, F, an inert gas removal unit, G, and a recycle gas compressor, H. To facilitate discussion of the invention, unit G will generally be referred to as a nitrogen removal unit, although it can be a unit which removes other inert gases, e. g., argon, from the waste gas.

CCF reactor A comprises cyclone section 2 and converter section 4. Cyclone section 2 has a water-cooled sidewall (not shown) and is equipped with tangentially disposed ore injection ports 6. Fuel and oxygen feed conduit 8 extends vertically downward from the top of reactor A into converter section 4 of the reactor. Coal supply line 10 and oxygen supply 12 are connected to the top of conduit 8. Iron ore and lime, supplied via line 14, are pneumatically conveyed by high purity oxygen, supplied through line 16, to injection ports 6 via line 18. Positioned at the bottom of reactor A are slag and molten iron removal taps 20 and 22, and gas injection lances 24 and 26.

Waste gas outlet line 28 rises from the top of reactor A and is connected to the inlet end of particle separator B. Separator B can be any dust collector suitable for separation of inorganic particles from hot gases. Typical of suitable particle separators are electrostatic precipitators, cyclone separators and bag houses. Fines recovery line 30 connects the collected particle discharge end of separator B to line 14. Clean waste gas line 32 connects the gas outlet of separator B to the inlet end of waste heat recovery unit C. Unit C can be any appropriate energy recovery plant, such as a waste heat boiler or a turbine generator. Alternatively, the position of separator B and heat recovery unit C can be reversed, or, for ease of operation, these units can be combined into a single assembly. Line 34 connects the outlet end of unit C with the inlet end of pretreatment unit D. Unit D serves to remove sulfur oxides and nitrogen oxides from the waste gas stream. To this end it may include means, for example a potassium carbonate scrubber, to remove sulfur compounds, and means, for example an ammonia-based facility, to reduce nitrogen oxides to nitrogen. The reduced sulfur and nitrogen products can be discharged from unit D via line 36. Purified gas line 38 joins the outlet of pretreatment unit D to the inlet of gas drier E, which may contain any suitable desiccant, such as alumina or silica gel. Dry gas discharge line 40 connects the outlet of drier E to the inlet of carbon dioxide separator F.

Separator F can be any unit which effectively separates carbon dioxide from other gases. It may, for example, be an absorption plant using ethanolamines as absorbents, a membrane separation unit, or an adsorption system having adsorption vessels packed with carbon dioxide selective adsorbent, such as alumina or 13X zeolite. Separator F is provided with carbon dioxide product discharge line 42 and with carbon dioxide-lean gas line 44. When separator F is an absorption system, it is generally preferred to position drier E downstream of separator F, since the carbon dioxide scrubbing agent is often an aqueous liquid, which will saturate the carbon dioxide-lean gas with moisture. Line 44 is connected to the inlet end of nitrogen separator G, which may be any appropriate inert gas-removal system, but typically is an adsorption system containing one or more adsorbents which selectively adsorb nitrogen and/or argon from the dry waste gas stream. Suitable adsorbents include, for example, 13X zeolite, $Ag^+$-exchanged type X zeolite, etc. Separator G is provided with inert gas discharge line 46 and is connected to compressor H via line 48.

Compressed carbon monoxide gas line 50 is connected to one or both of molten iron phase stirring gas supply line 52 or slag phase stirring gas supply line 54. The downstream end of line 52 is connected to stirring gas lances 24 and the downstream end of line 54 is connected to stirring lance 26. Although the system is illustrated with one slag phase stirring lance and two molten iron phases stirring lances, any number of stirring lances may be used to provide agitation to the material in these zones. In the system illustrated in the drawing, Carbon monoxide and nitrogen import gas lines 56 and 58, respectively are connected to line 50.

In an alternate embodiment, separators F and/or G are replaced by a carbon monoxide separator (not shown), which can be any appropriate carbon monoxide removal system, but is preferably an adsorption plant having an adsorbent which selectively adsorbs carbon monoxide. Typical of carbon monoxide-selective adsorbents which can be used in the carbon monoxide plant are adsorbents which are impregnated or exchanged with $copper^+$ ions or $silver^+$ ions. Examples of suitable adsorbents are copper chloride-impregnated alumina, copper ion-exchanged type X zeolite, silver ion-exchanged type X zeolite, zeolite 5A, etc.

Separator F and/or separator G and/or the carbon monoxide separator of the above-described alternate embodiment (when any or all of these are adsorption systems) can each comprise a single adsorption unit or a battery of adsorption units operated in phase, or a plurality of adsorption units or batteries of adsorption units operated out of phase, whichever is desired. When a system comprising a single adsorption unit or a battery of units all of which are operated in phase is used, the adsorption step must be periodically stopped to permit regeneration of the adsorbent bed(s), whereas when a plurality of adsorption units are employed in parallel and operated out of phase, one or 5 more units can be in the adsorption stage, adsorbing the desired gas component, while one or more other units are undergoing regeneration to desorb and collect the adsorbed gas component. Operation of the adsorption systems of the invention is cyclical. In preferred adsorption systems, cycles are repeatedly carried out in a manner such that production of the desired product gas is substantially continuous. In preferred embodiments of the invention, the adsorption processes are carried out in multibed systems which comprise a battery of adsorption vessels arranged in parallel and operated of phase to provide continuous production of nonadsorbed and desorbed components.

In another alternate embodiment, separator G is eliminated from the process train and a purge line is installed in the system in, for example, line 38 or line 44, to vent sufficient gas from the system to prevent a buildup of nitrogen and/or other inert gases in the system. This embodiment may be advantageously employed when it is desired to use, for example, a blend of carbon monoxide and nitrogen, a blend of carbon monoxide and argon or a blend of carbon monoxide, nitrogen and argon as the stirring gas.

In yet another alternate embodiment, separators F and G are eliminated from the process train and a purge line is installed to vent a portion of the gas stream exiting pretreatment unit D. This embodiment may be advantageously used when it is deemed unnecessary to remove all of the carbon dioxide and nitrogen from the recycle gas stream.

In practicing the invention using the system illustrated in the drawing, a fuel, preferably finely ground coal, and pure oxygen are continuously introduced into reactor A through lines 10 and 12, respectively and combusted therein, thus producing heat, carbon monoxide and carbon dioxide. The hot gases pass upwardly through sections 4 and 2 of reactor A and exit the reactor through waste gas discharge line 28. When the temperature in reactor A reaches the desired operation temperature (about 1500 to about 2000° C.), a mixture of finely pulverized iron ore and lime is introduced via line 14 into line 18, where it is fluidized with pure oxygen from line 12, and the fluidized mixture is injected into cyclone section 2 of reactor A through tangential ports 6. The pulverized iron ore-limestone mixture swirls rapidly around the interior of cyclone 2 and comes into intimate contact with the hot gases rising through the cyclone. The iron ore is rapidly melted and undergoes partial reduction to ferrous oxide according to the equation:

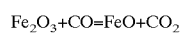

The melted and partially reduced iron oxide is thrown by centrifugal force onto the water-cooled side wall of reactor A and trickles downwardly into converter section 4 of the reactor. The molten ore, continually heated by combustion of the coal entering section 4 through line 8, comes into contact with additional carbon monoxide and is further reduced to metallic iron according to the equation:

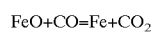

The molten iron together with the lime and mineral impurities contained in the ore forms a two layer pool at the bottom of section 4, with molten iron forming bottom layer 60 (the molten iron phase) and the impurities forming top layer 62 (the slag phase). Periodically during the process, slag and molten iron are removed from reactor A through lines 20 and 22.

In conventional CCF processes, nitrogen, introduced into the system via line 58 and 52, is bubbled upwardly through the molten iron and slag phases via lances 24 and/or 26 to agitate the iron ore and slag and thereby promote substantially complete reduction of the iron ore. In this invention the nitrogen is partially or fully replaced by carbon monoxide, part or all of which may be imported into the system via line 56, or obtained as a recycle stream from the reactor A waste gas, purified and recovered according to the procedures described below.

The waste gas leaving reactor A through line 28 is at a temperature of about 1800° C. Conventionally this gas, which, as noted above, contains, by volume, about 10 to 35% carbon monoxide, about 40–55% carbon dioxide and the remainder mostly nitrogen, water vapor, nitrogen oxides and sulfur oxides, is treated to remove entrained solids, processed in a waste heat system to recover heat energy, purified to remove sulfur compounds and $NO_x$, and combusted to recover additional energy from the unreacted carbon monoxide in the gas.

According to one aspect of this invention the carbon monoxide recycled to the reactor is recovered from the waste gas by a series of steps. In the first step, the waste gas is cleaned in particle separator B. The recovered dust particles, comprised of fines of iron ore, lime and coal, can be discharged from the system, but is preferably recycled to iron ore/lime feed line 14 via line 30 for reintroduction into reactor A. The clean waste gas is next sent to waste heat recovery unit C where it is used to generate heat and/or mechanical or electrical energy. The cooled gas exiting unit C through line 34 next enters pretreatment unit D wherein sulfur compounds and $NO_x$ vapor are removed via line 36. The purified gas is next passed through drier E for removal of water vapor, and then sent to optional carbon dioxide recovery unit F for separation of carbon dioxide. Carbon dioxide is removed from the system via line 42, and in a preferred embodiment of the invention, part or all of the carbon dioxide is further processed and recovered as a high purity byproduct. The purified and dry carbon dioxide-depleted gas stream leaves separator F through line 44 and enters optional separator G, wherein nitrogen and/or other inert gases are separated from the waste gas stream and discharged from the system through line 46. The gas stream leaving separator G is now comprised substantially of carbon monoxide. This gas stream is compressed and reintroduced into reactor A through lines 52 and/or 54 and a pressure sufficiently high to provide the desired agitation of molten layer 60 and foamy slag layer 62.

As mentioned above, the carbon monoxide recycled to reactor A can be recovered from the waste gas by replacing separators F and/or G with a separator which removes carbon monoxide from the dry waste gas. As also mentioned above, one or both of separators F and G may be eliminated from the system and sufficient waste gas purged from the system to prevent carbon dioxide and/or nitrogen and/or other inert gases from building up in the system, and the remaining gas mixture recycled to reactor A.

As noted above, it may be desirable to include nitrogen and/or carbon dioxide in the reducing gas that is used to stir the molten iron and/or slag phases. The nitrogen and/or carbon dioxide can be beneficial in preventing or minimizing erosion of the stirring tuyeres by the reducing gas. Carbon dioxide may provide the additional benefit of reducing the carbon content of the molten iron and generating additional carbon monoxide reducing gas by the reaction:

$$C+CO_2=2CO$$

The nitrogen and/or carbon dioxide can be mixed with the reducing gas or introduced into reactor A separately from the reducing gas. In a preferred embodiment, the tuyeres can comprise concentric conduits (not shown), with the reducing gas being introduced into reactor A through the inner conduit and the nitrogen and/or carbon dioxide being introduced via the annular space between the wall of the inner conduit and that of an outer concentric conduit. This will provide additional protection to the outlet end of the inner conduit.

In some cases, it may be desirable to introduce hydrogen, methane and/or other hydrocarbons (as well as carbon monoxide) into the system as supplemental fuel. This can be accomplished by introducing these gases into line 50 via line 56 and/or directly into the gas phase formed above the slag phase.

In another embodiment of the invention reducing gas is introduced into the gas phase which is above slag phase 62 in reactor A.

A number of advantages are realized by practice of this invention. Firstly, more efficient reduction of the molten iron ore in the bottom of the converter/smelting furnace is provided by using carbon monoxide as a stirring gas in place of nitrogen. Secondly, the amount of coal and oxygen necessary to provide adequate heat and reducing agent for satisfactory performance is significantly reduced. Thirdly, the overall efficiency of the conversion process is considerably enhanced by recycling carbon monoxide to the reactor, thereby reducing the net carbon monoxide discharged from the ironmaking furnace. Fourthly, the concentration of carbon dioxide byproduct is increased, although the total quantity of carbon dioxide produced is decreased. Additionally, the sulfur compounds and $NO_x$ in the furnace exhaust are reduced.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis.

EXAMPLE 1

Comparative

A commercial software-based process model of the operation of an ironmaking plant similar to the plant illustrated in the FIGURE was developed using nitrogen as the stirring gas. Iron ore feed to the cyclone section of the reactor was assumed to be 1500 kg/hr or ore containing 92.55 mole percent $Fe_2O_3$ and the balance mineral oxides.

Limestone (CaO) feed to the cyclone section was assumed to be in the amount of 110 kg/hr and coal in the amount of 640 kg/hr was assumed to be fed to the converter section of the reactor. Oxygen feed required to attain the desired temperature and ore reduction rate is predicted to be 181 $Nm^3$ to the cyclone section of the reactor and 329 $Nm^3/hr$ to the converter section of the reactor. Nitrogen stirring gas in the amount of 90 $Nm^3/hr$ was assumed to be injected into the molten iron. During operation, the temperature of the molten iron, the slag and exit gases were modeled at 1540, 1600 and 1800° C., respectively. Pressure in the reactor was modeled at 4 bar, gauge.

The amount of molten metal and slag produced in the simulated run is predicted to be 1019.4 kg/hr and 249 kg/hr, respectively. The molten metal is predicted to contain 95.4 mole percent iron and 4 percent carbon. Off gas in the amount of 1258 Nm$^3$/hr is predicted to be produced. The off gas is predicted to comprise 44% (by volume) carbon dioxide, 26.6% water, 18.6% carbon monoxide, 10% nitrogen and argon, and 3.6% hydrogen.

EXAMPLE 2

The simulation of Example 1 was repeated except that carbon monoxide was modeled to be substituted for the nitrogen stirring gas. The amount of molten metal and slag produced in this simulated run is predicted to be 1018.4 kg/hr and 244.5 kg/hr, respectively. The molten metal is predicted to contain 95.4 mole percent iron and 4 percent carbon. The rate of coal feed predicted to be required to maintain the same conditions as in Example 1 is 540 kg/hr. The predicted oxygen flow rates to the cyclone and converter are 168 Nm$^3$/hr and 282 Nm$^3$/hr, respectively. Off gas in the amount of 1069 Nm$^3$/hr is predicted to be produced. The off gas is predicted to comprise 56.8% (by volume) carbon dioxide, 26.6% water, 13.3% carbon monoxide, 2.8% nitrogen and 3.6% hydrogen.

A comparison of the results obtained in Examples 1 and 2 illustrate that when carbon monoxide is substituted for nitrogen as the stirring gas, 16% less coal and 12% less oxygen is predicted to be required. Also, a 15% reduction in off gas is predicted, with the reduction in carbon monoxide and nitrogen in the waste gas predicted to be 39% and 76%, respectively, and the increase in carbon dioxide in the waste gas predicted to be 9.7%. Thus, operation of the plant is considerably more economical when nitrogen is replaced by carbon monoxide as the stirring gas. Additionally, a significantly higher concentration of carbon dioxide is produced. The model also predicts that the amount of sulfur compounds and nitrogen oxides in the waste gas will be considerably reduced when carbon monoxide is used as the stirring gas.

Although the invention has been described with particular reference to specific equipment arrangements and to specific experiments, these features are merely exemplary of the invention and variations are contemplated. For example, it may be desirable to inject more carbon monoxide than the amount required to just provide the degree of stirring formerly provided by the nitrogen. This will further reduce the fuel needed to heat the furnace and effect the desired iron reduction. As other alternatives, fuels other than coal can be used in the process and the fuel-air mixture can be charged into one or both of the molten iron phase and the foamy slag phase, rather than above these phases. Furthermore, the order of off gas purification and separation steps can be changed, or additional or fewer steps employed. The scope of the invention is limited only by the breadth of the appended claims.

What is claimed is:

1. In a process for producing iron from iron ore comprising the steps:

(a) combusting a carbonaceous fuel with oxygen in a reactor having a reservoir, thereby producing heat and carbon monoxide;

(b) contacting iron ore and slagging agent with said carbon monoxide in said reactor in the presence of said heat, thereby converting iron oxides in the ore to molten iron and forming in said reservoir a molten iron phase and a slag phase;

(c) periodically removing molten iron and slag from said reactor; the improvement comprising introducing reducing gas selected from the group consisting of carbon monoxide, hydrogen, a mixture of carbon monoxide with hydrocarbons, a mixture of hydrogen with hydrocarbons, and a mixture of carbon monoxide and hydrogen with hydrocarbons into said molten iron phase, into said slag phase or into both said molten iron phase and said slag phase, wherein the ratio of total moles of carbon monoxide and hydrogen to the total moles of carbon dioxide and water vapor in said reducing gas is at least 5;

(d) discharging from said reactor a carbon monoxide-containing off gas; and (e) introducing a diluent gas obtained from said carbon monoxide-containing off gas selected from the group consisting of nitrogen, argon, carbon dioxide, and combinations of these into said molten iron phase or into said slag phase or into both said molten iron phase and said slag phase.

* * * * *